June 16, 1953        T. SHINE        2,642,312
GARDEN HOSE REEL
Filed May 16, 1949
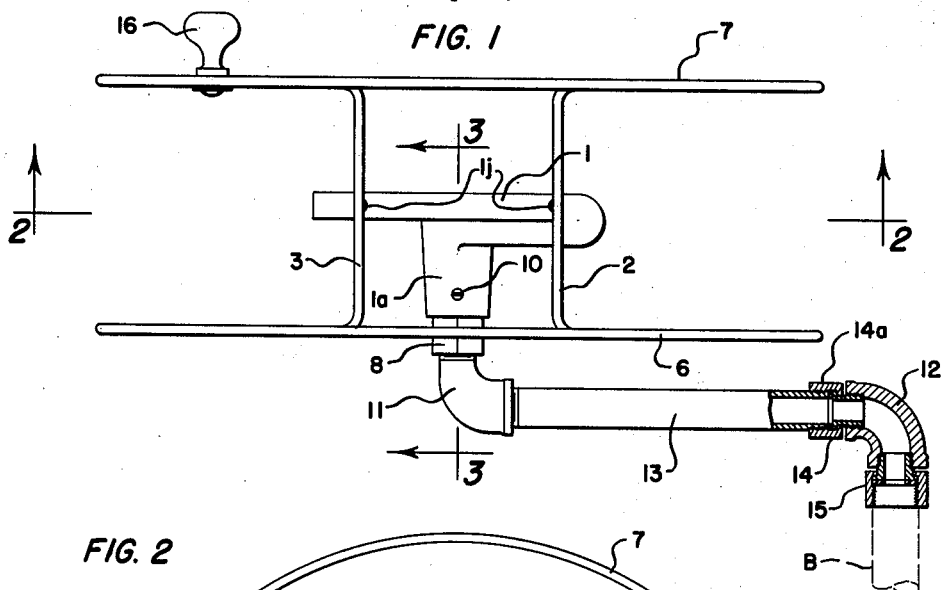
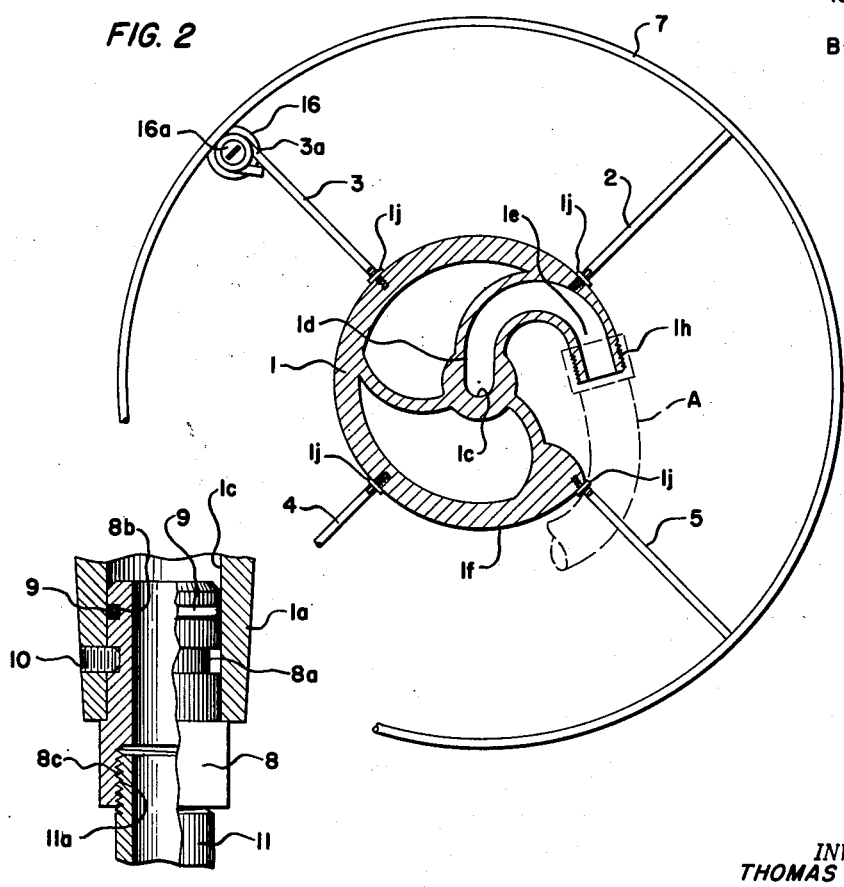
INVENTOR.
THOMAS SHINE
BY
*Wm. H. Dean*
AGENT Patented June 16, 1953

2,642,312

UNITED STATES PATENT OFFICE 2,642,312

GARDEN HOSE REEL

Thomas Shine, Coronado, Calif., assignor, by direct and mesne assignments, to George G. Ellinwood, San Diego, Calif.

Application May 16, 1949, Serial No. 93,476

4 Claims. (Cl. 299—78)

My invention relates to a garden hose reel, more particularly for supporting a hose in coiled condition, and for readily extending and retracting the same, and the objects of my invention are:

First, to provide a hose reel of this class which may be readily connected to a conventional water standpipe or faucet, and may be disposed at any desired angle, so that the axis of the reel is universally adjustable;

Second, to provide a reel of this class having novel water inlet conductor and hub means, with which U-shaped reel spokes are connected in a novel structural arrangement;

Third, to provide a hose reel of this class having very simple and easily operated swivel means which permit rotation of the reel about its axis for uncoiling the hose therefrom and retracting the same, while said swivel conducts water through the reel to the hose;

Fourth, to provide a reel of this class which saves considerable time and effort in extending and retracting hoses, and also preserves the hose and prolongs the life thereof;

Fifth, to provide a hose reel of this class which automatically drains the hose as it coils the same, due to the elevation of the reel above the axis of the hose lying on the ground;

Sixth, to provide a reel of this class having revolving couplings interconnected by an elbow which provide an attachment for the reel to a water faucet or standpipe, which permits universal adjustment of the axis of the reel about two axes, one disposed vertically and the other disposed horizontally; and Seventh, to provide a hose reel of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a top or plan view of my garden hose reel, showing portions thereof broken away and in section to amplify the illustration; Fig. 2 is a fragmentary sectional view, taken from the line 2—2 of Fig. 1; and Fig. 3 is an enlarged fragmentary sectional view taken from the line 3—3 of Fig. 1.

Similar characters of reference refer to similar parts and portions throughout the several views of the drawings.

The combined water conductor and hub 1, reel spokes 2, 3, 4 and 5, rings 6 and 7, reel swivel member 8, O-ring 9, screw 10, elbows 11 and 12, pipe 13, couplings 14 and 15, and the reel handle 16, constitute the principal parts and portions of my garden hose reel.

The combined water conductor and hub 1 or spider is preferably cast of a corrosion-resistant material, and is provided with a hollow tubular water inlet swivel hub 1a, as shown in Figs. 1 and 3 of the drawings, in which the reel swivel member 8 is revolubly mounted. This reel swivel member 8 is a hollow cylindrical member provided with an external annular groove 8a, engaged by the inwardly projecting end of the screw 10, which is screw-threaded in the side wall of the hub 1a, as shown in Fig. 3 of the drawings. The swivel member 8 is provided with a secondary annular groove 8b, in which the O-ring 9 is positioned. This O-ring is a circular endless member, preferably made of synthetic rubber, which forms a rotating seal for water entering the reel swivel member 8 and passing into the combined water conductor and hub 1.

The bore 1c of the hub portion 1a in which the swivel member 8 is revolubly mounted is provided with a radially disposed portion 1d, which extends in curved relation radially of the reel, as shown in Fig. 2 of the drawings, to the curved outlet bore 1e, which is disposed substantially chordally and is directed toward the peripheral surface 1f of the combined water conductor and hub 1, so that a hose, as indicated by dash lines A, may be secured to the externally screw-threaded portion 1h of said combined water conductor and hub 1, surrounding the bore portion 1e at the outlet thereof.

The combined water conductor and hub 1 is provided with notch portions 1j in the periphery thereof, in which the reel spokes 2 to 5 are embedded at the middle of their U-shaped portions, as shown in Fig. 1 of the drawings. These reel spokes 2 to 5 are preferably fused to the screws 1j, which are secured in the water conductor and hub 1.

The opposite ends of the U-shaped reel spokes 2 to 5 are connected to the rings 6 and 7 by welding, or other suitable means. It will be noted that the spokes 2 to 5 are substantially ninety degrees from each other in radial disposition, as shown in Fig. 2 of the drawings, and that one end of the spoke 3 is provided with a loop portion 3a, which is welded at its extremity to the ring 7, and extending through this loop portion 3a is a bolt 16a, which forms the pivotal support for the reel handle 16, which is a conventional knob-type handle, all as shown best in Figs. 1 and 2 of the drawings. It will be noted that the width of the hose reel extending axially of the hub portion 1a may be varied as desired by forming the middle portions of the spokes 2 to 5, inclusive, to the desired dimensions. Thus, the capacity of the reel in connection with the combined water conductor and hub may be varied.

The elbow 11 is provided with an externally screw-threaded end portion 11a, which is secured in the internally screw-threaded portion 8c of the reel swivel member 8, as shown best in Fig. 3 of the drawings. Fixed in screw-threaded relation with the opposite end of the elbow 11 is the pipe 13. This pipe 13 is screw-threaded to the rotating collar 14a of the coupling 14 at its opposite end, and the coupling 14 is fixed to the elbow 12 in screw-threaded relationship therewith, as shown in Fig. 1 of the drawings, and the coupling 15, of similar construction to the coupling 14, may be secured in screw-threaded relation with a conventional standpipe, as indicated by dash lines B in Fig. 1 of the drawings, or may be connected to the outlet of a conventional water faucet, as desired. The couplings 14 and 15 provide pivotal adjustments for the axis of the hose reel on a vertical axis and a horizontal axis, or may provide adjustment on any varied angular axis to the vertical or horizontal, as desired, in accordance with the angular relationship of the standpipe B or the water faucet to the horizontal. Thus, if it is desired, the axis of the reel may be set on a horizontal position, regardless of the angular disposition of the supply pipe or standpipe B, all as shown in Fig. 1 of the drawings.

The operation of my garden hose reel is substantially as follows:

When the coupling 15 is connected to a water supply pipe, as hereinbefore described, the reel 1 may be adjusted in various angular positions, as desired, and then the collars of the couplings 14 and 15 may be tightened for fixing the pipe 13 in a movable position. The reel may then be rotated about the axis of the reel swivel member 8, while the O-ring 9 provides a seal for water conducted under pressure through the reel swivel member 8 and into the combined water conductor and hub 1 to the hose A, as indicated by dash lines in Fig. 2 of the drawings.

It will be noted that the hose A may be unwound during issuance of water therethrough, or may be partially unwound from the reel, or may be retracted by reel during the actual issuance of water through the hose. The handle 16 provides for the retraction of the hose onto the reel, while the reel may be rotated for paying out the hose by simply pulling on the hose. The reel spokes 2 to 5, being U-shaped in form and fixed to the inner sides of the annular rings 6 and 7, provide lateral support for the convolutions of hose surrounding the middle portions of the reel spokes, which extend substantially parallel to the revoluble axis of the reel, which is concentric with the bore portion 1c of the combined water conductor and hub 1. The screw 10, engaging the annular groove 8a in the reel swivel member 8, prevents longitudinal shifting of the combined water conductor and hub 1 on the reel swivel member 8.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a swivel connection for water conductors, a tubular conductor having an externally threaded terminal, a hollow tubular hub member having a smooth cylindrical bore therein and having a finished end, a second hollow tubular member freely rotatably positioned in said bore and having an enlargement including a shoulder frictionally engaging said end, said second hollow tubular member having an annular groove therein, a resilient ring in said groove contacting said first mentioned bore, said enlargement having an axial threaded bore engageable on said threaded terminal and detent means for maintaining said second hollow tubular conductor in said hollow tubular member whereby said hub member is adapted for rotation relative to said second member.

2. In a garden hose reel apparatus, a pair of spaced apart coaxial rings, a plurality of U-shaped members each having free arms and a base portion, said free arms arranged as spokes in said rings and welded thereto with said base portions extending parallel to and slightly spaced from the common axis of the rings, a combined water conductor and hub member fixedly mounted to and between the plurality of base portions as the common axis of said rings.

3. In a garden hose reel apparatus, a pair of spaced apart coaxial rings, a plurality of U-shaped members having free arms and a base portion, said free arms arranged as spokes in said rings and welded thereto with said base portions extending parallel to and slightly spaced from the common axis of the rings, a combined water conductor and hub member fixedly mounted to and between the plurality of base portions at the common axis of said rings, a water inlet at the center of said hub, a spiral rib extending between said water inlet and an outer portion of said hub and comprising a conduit, and a hose nipple at the outer end of said conduit, a tubular conductor having an externally threaded terminal, said combined conductor and hub member having a bore therein and having a finished end, a second hollow tubular member freely rotatably positioned in said bore and having an enlargement including a shoulder frictionally engaging said end, said second hollow tubular member having an annular groove therein, a resilient ring in said groove contacting said first mentioned bore, said enlargement having an axial threaded bore engageable on said threaded terminal and detent means for maintaining said second hollow tubular conductor in said hollow tubular member whereby said hub member is adapted for rotation relative to said second member.

4. A hose reel comprising an axially elongated hub having an axial bore therein and having a finished end, a second hollow tubular member freely rotatably positioned in said bore and having an enlargement including a shoulder frictionally engaging said end, said second hollow tubular member having an annular groove therein, a resilient ring in said groove contacting said first mentioned bore, said enlargement having an axial threaded bore engageable on said threaded terminal and detent means for maintaining said second hollow tubular conductor in said hollow tubular member whereby said hub member is adapted for rotation relative to said second member and whereby water can be directed into the first mentioned bore at one end of said hub, a hose connection on the other end of said hub, a spider connected to said hub adjacent said other end thereof, U-shaped spokes having the central points of their bight portions parallel to each other and fixed to said spider and having their arms radially extending in two parallel planes on each side of said spider in equiangularly spaced relation, and a pair of rings arranged coaxially of said hub in said planes, said spokes being terminally secured to said rings.

THOMAS SHINE.

References Cited in the file of this patent

UNITED STATES PATENTS

| Number | Name | Date |
|---|---|---|
| 358,953 | Wirt | Mar. 8, 1887 |
| 1,226,575 | Nii | May 15, 1917 |
| 1,244,818 | Wirt | Oct. 30, 1917 |
| 1,417,459 | Cox | May 23, 1922 |
| 1,726,084 | Montgomery | Aug. 27, 1929 |
| 2,339,245 | Bates | Jan. 18, 1944 |
| 2,481,404 | Donner | Sept. 6, 1949 |